United States Patent

[11] 3,602,009

| [72] | Inventor | Patrick L. Powell |
| --- | --- | --- |
| | | Franklin Park, Ill. |
| [21] | Appl. No. | 861,056 |
| [22] | Filed | Sept. 25, 1969 |
| [45] | Patented | Aug. 31, 1971 |
| [73] | Assignee | Stewart-Warner Corporation |
| | | Chicago, Ill. |

[54] SNAP ON FERRULE
5 Claims, 10 Drawing Figs.

[52] U.S. Cl. .................................................. 64/4,
285/319, 285/320, 287/119 R
[51] Int. Cl. ...................................................... F16c 1/06
[50] Field of Search........................................... 73/493,
494; 64/4; 285/317, 319, 7, 423 SF, 320; 287/119

[56] References Cited
UNITED STATES PATENTS

| 2,309,713 | 2/1943 | Ratkowski..................... | 287/119 |
| --- | --- | --- | --- |
| 2,872,793 | 2/1959 | Botti............................. | 64/4 |
| 3,192,499 | 6/1965 | West ............................. | 339/91 |
| 3,234,757 | 2/1966 | Stadelmann..................... | 64/4 |
| 3,328,977 | 7/1967 | Wallis, Jr........................ | 64/4 |

*Primary Examiner*—Richard C. Queisser
*Assistant Examiner*—Herbert Goldstein
*Attorneys*—Augustus G. Douvas, William J. Newman and Norton Lesser ABSTRACT: A unitary plastic ferrule for coupling a speedometer cable to a speedometer input shaft is formed of two different sized tubular portions having a longitudinally extending, flexible, integral latch, intermediate of the ends of one of the tubular portions to present full circumferential contact between the concentric ferrule and the tubular boss to which it is latched.

PATENTED AUG 31 1971

INVENTOR
PATRICK L. POWELL

BY Morton Lesser
ATTORNEYS.

INVENTOR.
PATRICK L. POWELL 3,602,009

SNAP ON FERRULE

BACKGROUND OF THE INVENTION

1. Field of the Invention

This invention relates to ferrules employed for coupling purposes, and more particularly to a simplified, positive latching arrangement for a unitary plastic ferrule employed in coupling a speedometer coaxial cable to the speedometer input shaft.

2. Description of the Prior Art

Until recently, speedometers in automotive vehicles and the like have had the input shaft coupled by means of a coaxial cable to the vehicle transmission with the speedometer shaft rotating at the same speed as the driving core of the coaxial cable. The speedometer cable normally terminates at the speedometer end, in an enlarged ferrule which is threaded to a boss projecting from the rear surface of the speedometer frame, within which, the magnet shaft of the speedometer is journaled. A nut on the end of the ferrule which itself is attached to the outer casing of the coaxial cable, is threaded onto the boss to hold the casing in place, and the driving member of the speedometer cable properly coupled to the speedometer magnet input shaft. Due to the necessity of threading the nut onto the threaded boss or speedometer frame projection, and the act of physically locating the parts in proper position requires an inordinate amount of time and connection is normally accomplished blind. Such threaded connection is further difficult since, in most cases, there is little working space behind the vehicle dashboard.

Attempts have been made to replace the threaded type of coupling with a unitary plastic ferrule which include an integrally formed, flexible, latching member for snap latching the ferrule onto the projecting cylindrical speedometer frame extension or boss. In one case, a unitary plastic ferrule is carried on the end of the flexible shaft casing, and is coupled to the stationary speedometer housing projection by a springlike hook which projects radially inwards therefrom and engages a formed recess after riding over a tapered bar of the cylindrical boss. The latching member is defined by a pair of longitudinally extending slots, spaced from the inner, open end of the plastic ferrule with the operating lever extending rearwardly, parallel to the slots and spaced slightly from the outer peripheral surface of the same. In coupling, the ferrule is hand pressed onto the boss and the hook is spread by the tapered annular surface of the boss, whereupon the hook engages a groove immediately behind the tapered surface to hold the ferrule in place with the speedometer input shaft and the coaxial cable core coupled together.

While this type of ferrule overcomes the problem of blind threading a rotating nut onto a threaded boss within the confined space, the coupling length is short as is the latching area. Further, while the boss and the ferrule are provided with tapered engaging surfaces to aid in the alignment of the ferrule, coupling is never assured since during assembly, the assembler is unable to see what he is doing and must listen for a click indicating the hooklike spring has snapped into the groove. This is not always audible over factory noise and assembly is often times incomplete. Additionally, and perhaps more importantly, due to the location of the hook, the longitudinal slots forming the same extend to the end of the ferrule and result in incomplete peripheral contact between the ferrule and the cylindrical boss receiving the same so that the peripheral wall of the ferrule is often subject to distortion and axial misalignment.

In an attempt to improve on the snap on ferrule, an alternate design, while providing a complete peripheral wall at the end of the ferrule which contacts the boss, to insure proper alignment between the hook or spring latch and the boss receiving the same, necessitated the formation of individual and separate plastic and metal parts with the plastic molded part being complex, and relatively fragile.

SUMMARY OF THE INVENTION

This invention is directed to an improved unitary plastic ferrule formed of different size tubular portions, with the larger diameter tubular portion carrying spaced, longitudinal slots extending along a length thereof to form unbroken cylindrical surfaces at the ends of the large diameter tubular portion. The slots terminate at one end in a laterally free edge and carries a depending, lever operated hook. A flexible lever extends parallel to and away from the lateral free end whereby depression of the lever acts to raise the hook from the annular groove within the cylindrical boss which supports the unitary ferrule in a concentric manner. A shoulder is formed between the inner large diameter tubular portion and the outer small diameter tubular portion to act as a thrust bearing for the flanged core of the speedometer cable. The shoulder is provided with an annular recess concentric with the bore of the small diameter tubular portion and the stationary boss of the speedometer casing includes an annular portion received therein to stably position the ferrule in latched position after latching of the same. Preferably, the large diameter and small diameter tubular portions are joined by a tapered portion such that the longitudinal slots extend inwardly from the outer tapered surface towards the speedometer cable but terminate short of the open end of the large diameter tubular portion.

DESCRIPTION OF THE PREFERRED EMBODIMENT

Figures 1, 2, 3:
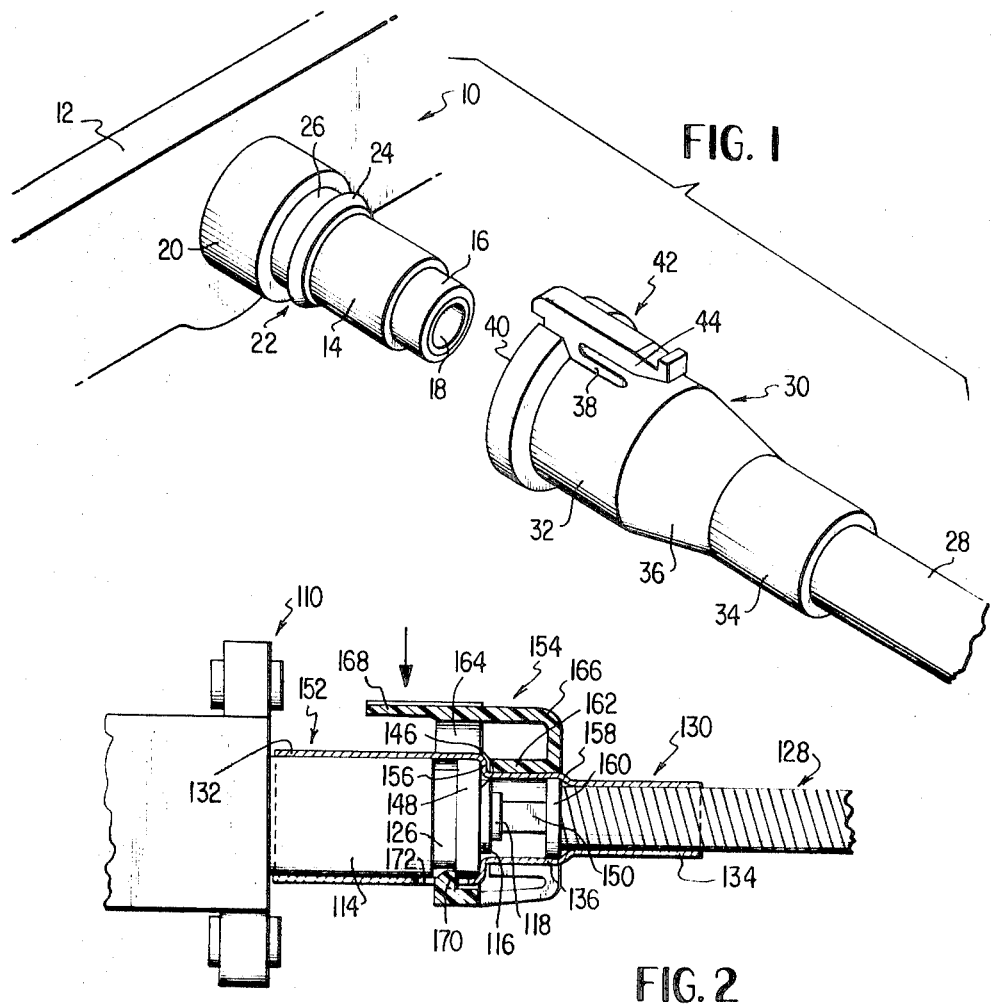
FIG. 1 is a perspective view of one type of prior art "snap on ferrule" for coupling a speedometer cable core to the input shaft of a vehicle speedometer.
FIG. 2 is a side sectional view, partially in section, of a second type of "snap on ferrule" employed by the prior art.
FIG. 3 is a perspective view of the improved unitary, plastic, "snap on ferrule" of the present invention.

The improved snap on ferrule of the present invention may be best appreciated by a comparison with typical prior art ferrules employed for like connections between a speedometer cable and the input shaft of the speedometer. Reference to FIG. 1 shows one prior art design in which a speedometer assembly 10 includes a frame 12, from which protrudes a multisection cylindrical boss 14 which carries in a concentric manner, a rotatable sleeve 16 including an inner cylindrical member 18 forming the female connecting element. The cylindrical housing or casing projection 20 has fixed thereto a smaller diameter tubular boss 14, which boss is provided with a tapered, annular collar or ring 22 having a tapered leading edge 24 and forming in conjunction with the end of cylinder 20, a hook receiving groove 26.

The speedometer drive cable 28 of conventional form comprises a coaxial cable and carries internally a rotating core member (not shown), operatively connected to a suitable driving cylinder (not shown) such as a vehicle wheel or vehicle transmission, the rotating core member terminating as the male coupling element which is received by female element 18 for driving the speedometer magnet shaft in conventional fashion. The ferrule 30 in the prior art arrangement of FIG. 1 comprises a unitary, molded plastic element consisting of a relatively large diameter tubular portion 32 at the inner end, a smaller diameter tubular portion 34 at the outer end and joined by a tapered tubular portion 36. A pair of slots 38 extend from the inner end 40 of the large diameter tubular portion, rearwardly and carry an integrally formed, hook or projection (not shown) which depends from the inner peripheral surface of a flexible latch 42. Flexible lever 44 extends rearwardly just above the outer peripheral surface of the large diameter tubular portion 32. While the arrangement of FIG. 1 eliminates the need for a threaded nut at this end of the speedometer cable, and a threaded boss projecting from the rear of the speedometer itself, the flexible latch with its springlike hook prevents full peripheral contact between boss 14 in the large diameter portion 32 of the ferrule at the forward end of the ferrule. The flexible latch and its integral hook are relatively small in size and length, such that the internal wall of the ferrule is readily subject to distortion and misalignment with respect to the boss receiving the same. This not only adversely effects proper operation and proper coupling of the driving cable 28 to the speedometer 10, but requires the assembler, who does so without seeing the coupling action, to listen for a "click" indicating that the hook of the flexible latch 42 has ridden over the tapered face 24 of the boss projection 22 and has snapped into groove 26. Since this click is not always audible over factory noise, assembly often times is not achieved.

As mentioned previously, attempts have been made to overcome this problem. One such design is shown in FIG. 2 in which the speedometer assembly 110 includes a cylindrical boss 114 protruding rearwardly therefrom, the boss being suitably grooved at 126 just behind the outer edge 146 to form a narrow peripheral flange 148. In like manner to the previous arrangement, an inner cylindrical member 116 rotates within the fixed boss 114 and carries a female connection element 118 which receives the male coupling member 150 which projects from the interior of coaxial cable 128 and forms part of the rotating core thereof. Unlike the prior art arrangement of FIG. 1, the ferrule 130 is not a unitary plastic molded element but in fact comprises two parts, a formed metal sleeve member 152 formed of thin sheet metal stock and carrying and attached separately molded plastic latch 154. The tubular metal sleeve 152 includes a large diameter tubular portion 132, a small diameter tubular portion 134 and an intermediate tubular portion 136 which joins the same. Thus, tubular portions 132 and 136 form a shoulder 156 while tubular portions 136 and 134 form a tapered shoulder 158. The rotating core 150 of the coaxial cable carries an enlarged diameter flange 160 which abuts the tapered shoulder 136 and acts as a thrust bearing for the rotating drive shaft. Further, shoulder 156 abuts the outer edge 146 of the stationary boss 114 to locate the ferrule axially with respect to the boss which carries the same.

Latch 154 which is a unitary molding of plastic includes a semicircular, small diameter base portion 162 and a larger diameter ring portion 164 which is attached thereto by spider 166. The operator lever constitutes in part, the annular ring 164 and a forwardly directed lever arm 168. Ring 164 on the side opposite lever arm 168, carries a projecting hook 170 which is adapted to project through an opening 172 formed within the large diameter tubular portion 132 of the metal sleeve 152. As sleeve 152 is slid onto the stationary boss 114, the spider 166 gives the necessary flexibility to the completely separate molded latch 154 whereupon, hook 170 falls into the annular groove or recess 126 of the stationary bar locking the cable by means of ferrule 130 to the rear end of the speedometer casing. Manual deflection of lever arm 168 inwardly as shown by the arrow causes outward deflection of hook 170 allowing release of the same.

While this arrangement provides a full cylindrical surface in front of the spring latch hook 170, the assembly requires a formed metal part and a completely separate plastic latch which makes the ferrule relatively complex and involves a necessity of preassembling the plastic and metal parts prior to placement of the ferrule and its latch on the speedometer end of the cable.

The improved snap on ferrule of the present invention is shown in FIGS. 3 through 6, inclusive. Referring to these Figures of the drawings, it is noted that the ferrule 230 constitutes a unitary molded plastic element including a large diameter tubular portion 232, a small diameter tubular portion 234 and a tapered tubular portion 236 joining the same. Slots 238 extend from points spaced rearwardly of the inner end of tubular portion 232 to form a passageway. An enlarged longitudinal recess 270 is provided rearwardly of the unitary, molded flexible latch 242. Therefore, slots 238 terminate in flattened opposed sidewalls 272 which define recess 270.

Figure 4:
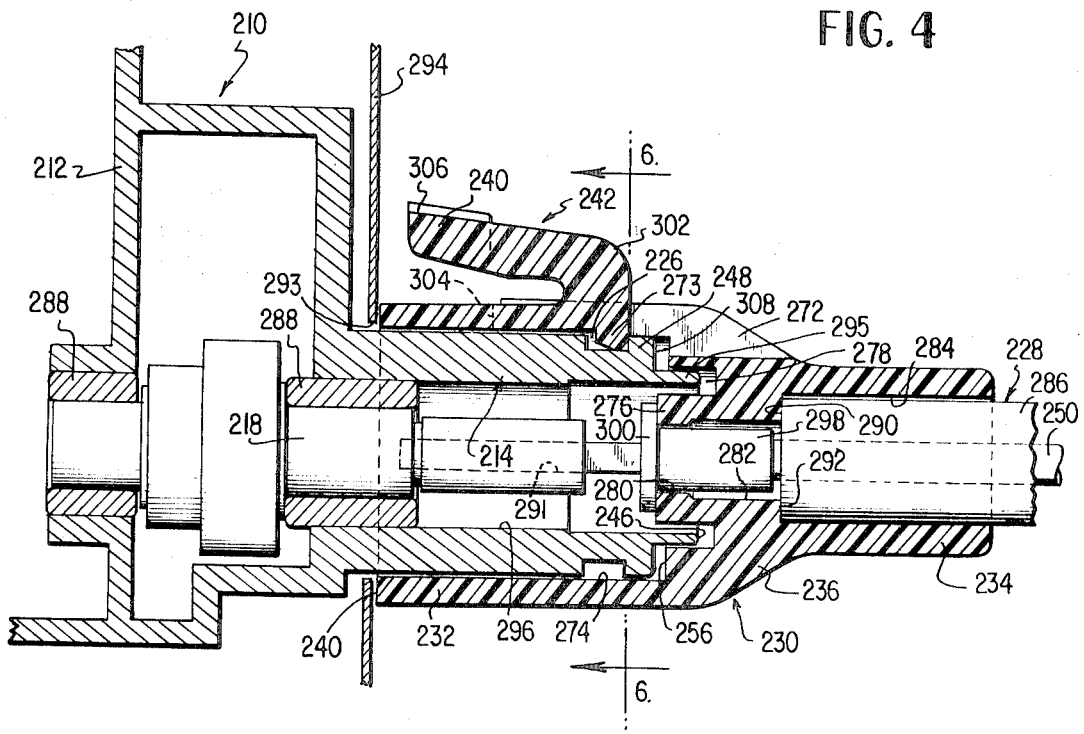
FIG. 4 is a side elevational view in section, of a portion of an automotive speedometer coupling arrangement incorporating the "snap on ferrule" of FIG. 3.
Figure 5:
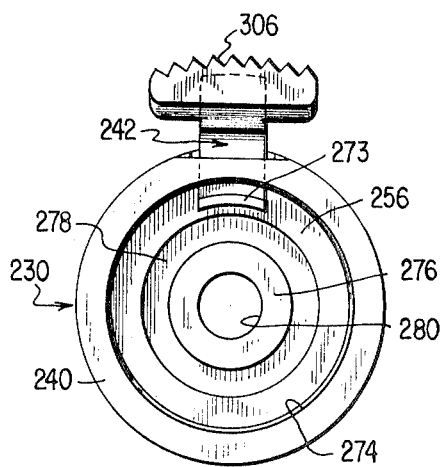
FIG. 5 is a front elevational view of the snap on ferrule shown in FIG. 3.
Figure 6:
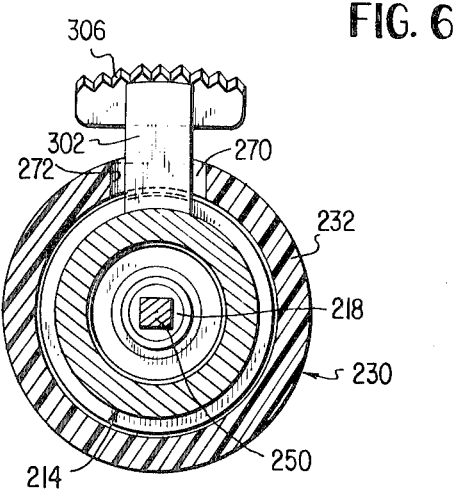
FIG. 6 is a rear elevational view, in section, of the coupling arrangement of FIG. 4 taken about lines 6—6.

The large diameter tubular portion 232 is provided with a relatively large diameter bore 274 which terminates in a formed shoulder 256, shoulder 256 being separated from annular rim 276 by annular recess 278. Rim 276 defines an annular thrust surface. Both the tapered portion 236 and the smaller diameter tubular portion 234 carry portions of the flexible, coaxial speedometer drive cable 228. Portion 236 carries bore 280 and counterbore 282 for receiving the terminal end of the rotating core 250 of the speedometer cable while the small diameter tubular portion 234 of the unitary ferrule carries molded counterbore 284 to receive the outer sleeve 286 of the speedometer cable 228 with end 290 of this sleeve abutting a shoulder 292 formed by bore 282 and counterbore 284. The speedometer assembly 210 involves, in part, casing 212 which carries the speedometer input shaft 218 mounted for rotation on spaced sleeve bearings 288, the outer end of the speedometer input shaft carrying a central recess having a reduced diameter portion which is axially bored at 291 to receive the flattened terminal portion of the speedometer cable core 250. In this respect, the speedometer casing 212 includes a formed cylindrical boss 214 in much the same manner as the prior art arrangements of FIGS. 1 and 2. Boss 214 fixedly carries one of the bearings 288 for supporting the speedometer input shaft for rotation about the shaft axis. The boss 214 projects through an appropriate opening 293 carried by the dashboard wall 294. An annular, peripheral recess 226 is carried near the forward end of boss 214, the recess 226 defining a radial flange 248. The radial flange 248 carries a reduced diameter portion 295 which terminates as the outer end 246 of boss 214. The boss 214 is suitably bored at 296 to carry bearing 288 and the projecting end of speedometer input shaft 218. The inner, terminal end of the speedometer cable core 250 is provided with an enlarged diameter collar 298 which includes a circular flange 300 at the forward end thereof, the flange 300 acting as a thrust bearing in conjunction with thrust annular surface 276. Thus, in rotation, the collar 298 being fixed to the core 250 rotates in contact with the relative fixed thrust surface to prevent axial movement of the cable core rearwardly once the ferrule 230 has been coupled to the relatively fixed boss 214. In this respect, the integral flexible latch 242 carries a depending tab or hook 273 at its outer end as an extension of transverse face 302. The flexible latch 242 terminates in a rearward direction, just short of the annular shoulder 256 formed by bore 274. Thus, the latch 242 is free to flex about a flexure line 304 defined by the inner end of slots 238. Flexure of latch 242 in a counterclockwise direction removes the hook 273 from recess 226 and occurs as a result of downward pressure exerted on lever 240, specifically on the serrated surface 306. This downward pressure has the effect of raising or lifting the hook 270 since the flexible latch flexes in a counterclockwise direction about the flexure line defined by the inner edge of slots 238. With the ferrule latched as shown in FIG. 4, the reduced diameter portion 295 of the boss is received within annular recess 278 of intermediate tubular portion 236 of the unitary plastic flange.

The large diameter portion of the flange has surfaces riding on either side of the projecting hook 273. Thus, the arrangement of the present invention provides a full cylindrical surface, both in front and behind the spring latch so that the ferrule is held in axial alignment at all times without wall distortion. The inner end 240 of the ferrule abuts the apertured wall 294 to locate casing 212 with respect to the wall subsequent to reception of hook 273 by the annular recess 226. Shoulder 256 nearly abuts end surface 308 of the boss while the side wall of recess 278 rides on the side of reduced diameter terminal portion 295 of the same boss. This further prevents wall distortion of the flexible molded ferrule with respect to the boss receiving the same. Assembly and disassembly is easily achieved and the relatively large surface area between the latch hook 270 and the outer end 246 of the boss not only insures the alignment, but reduces the possibility of fracture of the molded plastic part.

Figure 7:
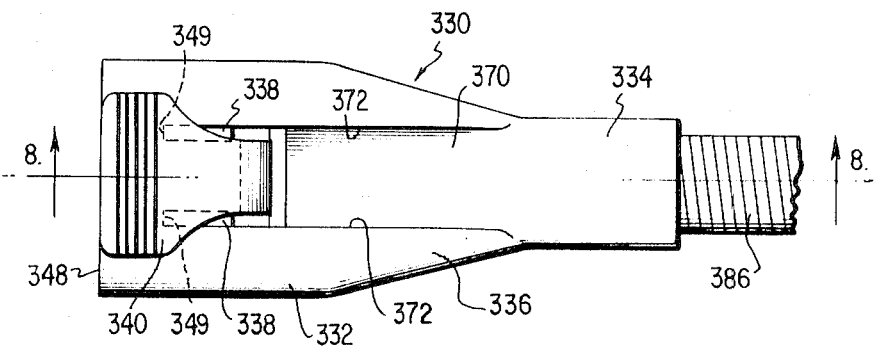
FIG. 7 is a top plan view of yet another embodiment of the improved "snap on" ferrule of the present invention.
Figure 8:
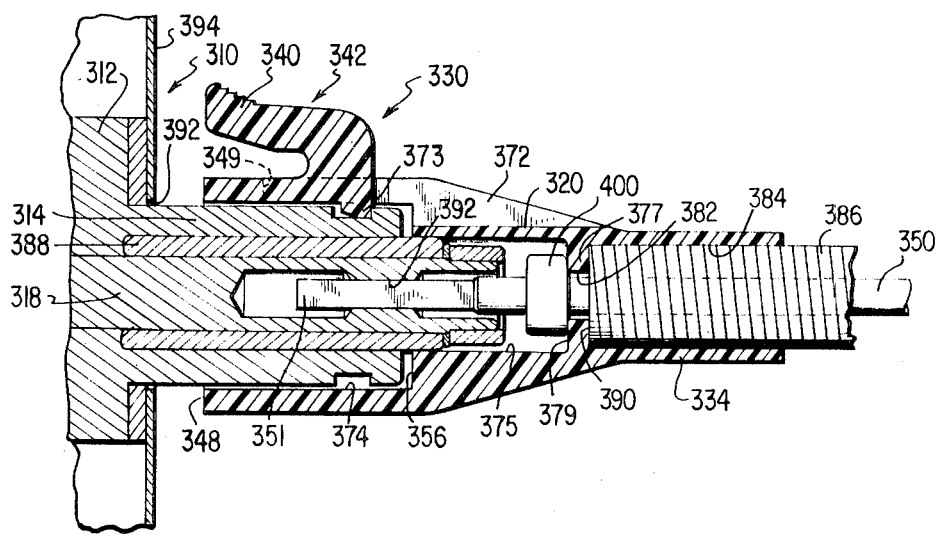
FIG. 8 is a sectional view of the ferrule of FIG. 7, when coupled, taken about lines 8—8.

An alternate form of the invention is illustrated in FIGS. 7 and 8 in which the ferrule 330 again comprises a unitary molded plastic element consisting of a large diameter tubular portion 332, a small diameter tubular portion 334 and a tapered intermediate tubular portion 336 joining the same. Slots 338 extend rearwardly from points 349 spaced rearwardly of the inner end 348 of tubular portion 332 to form a passageway. An enlarged longitudinal recess 370 is formed by slots 338 terminating in flattened, opposed sidewalls 372 which define recess 370.

Again, the large diameter tubular portion 332 is provided with a relatively large diameter bore 374 terminating in a formed annular shoulder 356. The tapered intermediate tubular portion 336 carries a reduced diameter bore 375 which partially defines shoulder 356. Bore 375 terminates at the junction of tapered tubular portion 336 and small diameter tubular portion 334 in an integral, circular wall 377 bored at 382 to receive speedometer cable core 350. Outwardly of wall 377, the small diameter tubular portion 334 carries a bore 384 of a diameter on the order of the speedometer casing 386. The end 390 of casing 386 abuts annular wall 377 with the headed end of the speedometer core received within the cavity formed by bore 375.

In like respects to the previous embodiment, the speedometer assembly 310 includes in part, casing 312 which carries speedometer input shaft 318 mounted for rotation within a cylindrical sintered bronze bearing 388 which itself is fixedly carried by a formed cylindrical boss 314 which extends integrally from casing 312 through an opening 392 carried by the dashboard wall 394.

Unlike the previous embodiment, the sintered bronze bearing 388 extends beyond the boss 314 on the back of the speedometer frame or casing 312 to permit part of the snap on ferrule 330 to utilize the sintered bronze bearing 388 for centering and alignment during coupling. In this respect, boss 314 is shortened in this embodiment. The input shaft 318 carries a formed axial recess 392 which is configured identically to the extreme inner end 351 of the speedometer cable core, the mating peripheries being preferably rectangular in cross section to insure positive drive between the core 350 and the input shaft 318. The speedometer cable core 350 further carries a metal washer 400 fixedly coupled to the same, just rearwardly of the configured terminal end 351. Annular wall 377 therefore defines within bore 375 of the intermediate tubular portion 336, a thrust shoulder 379 to prevent the shaft from moving rearwardly into the ferrule casing.

In like manner to the previous embodiment, a flexible latch 342 is formed integrally with ferrule 330 and carries a depending projecting hook 373 and an upwardly inclined oppositely directed latch operator or lever 340. In all other respects, the operation and coupling of the ferrule 330 to boss 314 and the simultaneous coupling of the ferrule carrying speedometer cable terminal end 351 to the speedometer input shaft 318 is accomplished in the same manner as the first embodiment. The materials constituting the separate elements of the assembly are identical to those of the first embodiment.

Figure 9:
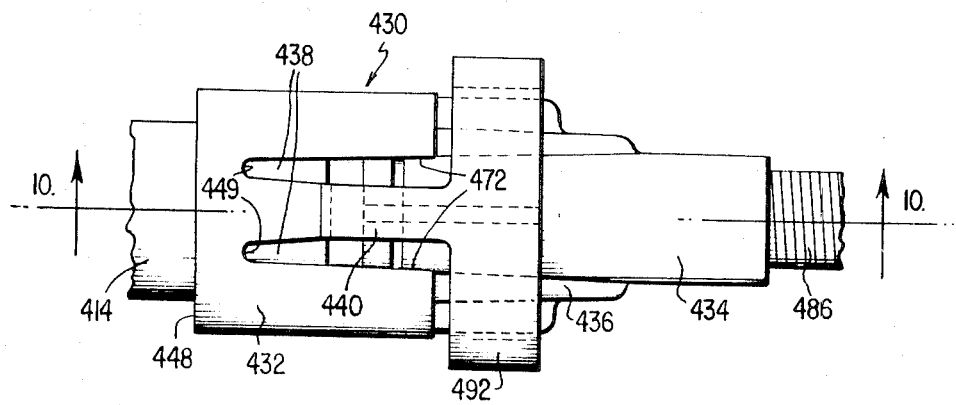
FIG. 9 is a top plan view of a further embodiment of the improved "snap on" ferrule of the present invention as coupled.
Figure 10:
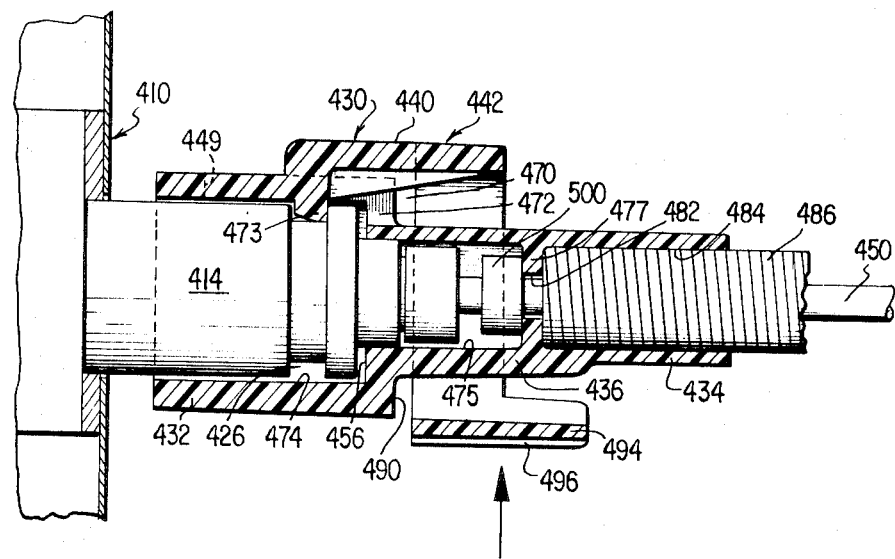
FIG. 10 is a sectional view of the ferrule of FIG. 9, taken about lines 10—10.

A further embodiment of the present invention is illustrated in FIGS. 9 and 10. Ferrule 430 again comprises a unitary molded plastic element in three parts consisting of a large diameter tubular portion 432, a smaller diameter tubular portion 434 and a tapered, intermediate tubular portion 436 joining the same. Slots 438 extend rearwardly from points 449 spaced rearwardly of the inner end 448 of the larger tubular portion 432 to form a passageway. The slots define an enlarged longitudinal recess 470 with the slots terminating in flattened, opposed sidewalls 472.

A relatively large diameter bore 474 is carried internally of the large diameter tubular portion 432 which terminates in a formed annular shoulder 456 partially defined by the reduced diameter bore 475 of the intermediate tubular portion 436. Again bore 475 terminates at the junction of tapered tubular portion 436 and a small diameter tubular portion 434, in an integral, circular wall 477 which carries bore 482 through which passes the speedometer cable core 450. The small diameter tubular portion 434 is provided with bore 484 of a diameter on the order of speedometer casing 486 carrying the cable core 450 and in similar manner to the previous embodiments, the end 490 of the speedometer casing abuts the right-hand side of the annular wall 477, with the headed end 500 of the speedometer core received within the cavity formed by bore 475.

The speedometer cable coupling ferrule 430 is shown in FIG. 10 as coupling a speedometer cable to the casing 410 carrying the speedometer itself, in similar fashion to the embodiment of FIGS. 3 through FIG. 8 inclusive. However, unlike the previous embodiments, the flexible latch 442 while formed integrally with ferrule 430, is somewhat different in configuration but having the attributes of the previous embodiment. In this respect, the latch 442 is provided with a depending projecting hook 473 which lies intermediate of the ends of the slots 438 and is adapted to be received, when the latch 442 is unflexed, within the annular peripheral groove 426 of the speedometer casing boss 414. Unlike the previous embodiment, the latch operator or lever 440 extends rearwardly, and in fact the latch operator or lever extends well beyond the outer end 490 of the large diameter tubular portion 432. Additionally, the outer end of lever 440 carries in integral fashion, an annular ring 492 which, on the side opposite lever 440 is provided with a longitudinal projecting portion 494 whose outer surface is serrated at 496. The ring 492 is spaced from and concentric with the intermediate tubular portion 436 of the unitary ferrule. Thus, in this variation of the unitary, plastic ferrule, the operator may readily place his thumb overlying the outer surface of lever 440 and have multiple fingers grasping the ring and extension 494 to provide additional area for allowing a lifting force to be exerted on the ring 492 and ring extension 494 to insure immediate upward flexing of hook 473 to release the same from the annular groove of the speedometer casing boss.

The unitary ferrule 430 is formed of the same plastic material as are the ferrules of the previous embodiments.

What is claimed is:

1. In a speedometer coupling arrangement for coupling the rotating core of a speedometer cable to a magnet shaft rotatably carried in a cylindrical speedometer casing boss with said boss having a peripheral groove intermediate the leading end of said boss and the speedometer end of said boss, the improvement comprising: a unitary plastic ferrule adapted to be fixed to said cable at one end and having an open end first tubular portion opposite said one end for receiving said boss leading end with the internal diameter of said tubular portion corresponding to the external diameter of said boss for coaxial engagement with said boss, an axially extending passageway in the annular wall of said tubular portion spaced intermediate the open end of said tubular portion and the opposite end of said tubular portion, a latch body integrally formed on said tubular portion intermediate the axially extending sides of said passageway and having a single juncture with said tubular portion at an axial position terminating said passageway adjacent said open end for flexure radially about the juncture of said latch body and said tubular portion, a hook on said latch body projecting radially inwardly from said latch body into said passageway for radial movement into said groove in response to axial alignment of said hook with said groove to prevent axial movement of said ferrule relative said boss with said tubular portion having peripheral surface contact with said boss on opposite axial sides of said latch hook to avoid distortion of said ferrule wall and to insure coupling of the ferrule to said boss, a second, reduced diameter tubular portion integrally joined to said first tubular portion between said first tubular portion and said ferrule one end and forming an internal shoulder therebetween, and an annular recess within said shoulder to receive the leading end of the boss coaxially positioned within said first tubular portion.

2. In a speedometer coupling arrangement for coupling the rotating core of a speedometer cable to a magnet shaft rotatably carried in a cylindrical speedometer casing boss with said boss having a peripheral groove intermediate the leading end of said boss and the speedometer end of said boss, the improvement comprising: a unitary plastic ferrule adapted to be fixed to said cable at one end and having an open end first tubular portion opposite said one end for receiving said boss leading end with the internal diameter of said tubular portion corresponding to the external diameter of said boss for coaxial engagement with said boss, an axially extending passageway in the annular wall of said tubular portion spaced intermediate the open end of said tubular portion and the opposite end of said tubular portion, a latch body integrally formed on said tubular portion intermediate the axially extending sides of said passageway and having a single juncture with said tubular portion at an axial position terminating said passageway adjacent said open end for flexure radially about the juncture of said latch body and said tubular portion, a hook on said latch body projecting radially inwardly from said latch body into said passageway for radial movement into said groove in response to axial alignment of said hook with said groove to prevent axial movement of said ferrule relative said boss with said tubular portion having peripheral surface contact with said boss on opposite axial sides of said latch hook to avoid distortion of said ferrule wall and to insure coupling of the ferrule to said boss, a second reduced diameter tubular portion integrally joined to said first tubular portion coaxial therewith and intermediate said first tubular portion and said ferrule one end, a radial wall integrally formed between said first and second tubular portions, and a cylindrical bearing concentrically positioned intermediate said boss and said magnet shaft for rotatably carrying said magnet shaft and fixed in position relative to said boss, said cylindrical bearing extending axially beyond the leading end of said boss and peripherally engaged by said second tubular portion, said boss being axially dimensioned to form an end radial wall at said leading end positioned for engaging said ferrule radial wall.

3. The speedometer coupling arrangement as claimed in claim 2 wherein; said ferrule includes an internal annular wall located axially beyond the end of said cylindrical bearing when said ferrule is coupled to said boss, said cable core extends through said annular wall with the outer casing of said speedometer cable having one end abutting one side of said wall, said core carries an enlarged diameter washer fixed thereto on the opposite side of said wall with said wall acting as a thrust bearing for said speedometer cable core washer.

4. In a speedometer coupling arrangement for coupling the rotating core of a speedometer cable to a magnet shaft rotatably carried in a cylindrical speedometer casing boss with said boss having a peripheral groove intermediate the leading end of said boss and the speedometer end of said boss, the improvement comprising: a unitary plastic ferrule adapted to be fixed to said cable at one end and having an open end first tubular portion opposite said one end for receiving said boss leading end with the internal diameter of said tubular portion corresponding to the external diameter of said boss for coaxial engagement with said boss, an axially extending passageway in the annular wall of said tubular portion spaced intermediate the open end of said tubular portion and the opposite end of said tubular portion, a latch body integrally formed on said tubular portion intermediate the axially extending sides of said passageway and having a single juncture with said tubular portion at an axial position terminating said passageway adjacent said open end for flexure radially about the juncture of said latch body and said tubular portion, a hook on said latch body projecting radially inwardly from said latch body into said passageway for radial movement into said groove in response to axial alignment of said hook with said groove to prevent axial movement of said ferrule relative said boss with said tubular portion having peripheral surface contact with said boss on opposite axial sides of said latch hook to avoid distortion of said ferrule wall and to insure coupling of the ferrule to said boss, said latch body includes an integral latch operator which extends from said body toward said ferrule one end beyond said inwardly projecting hook, an annular ring carried solely by said latch operator at the extending end of said operator in spaced concentric fashion with said open ended tubular portion whereby grasping of said ring and radially inward pressure on said ring at a position spaced generally diametrically opposite said hook and latch body facilitates radial flexure of said latch body in a direction to remove said hook from said speedometer casing boss groove, and a longitudinally extending enlarged surface portion on said ring diametrically opposite said projecting hook to facilitate tactile determination of said diametrically opposite position and the application of said pressure for facilitating coupling and decoupling of said ferrule to and from said cylindrical speedometer casing boss.

5. In a speedometer coupling arrangement for coupling the rotating core of a speedometer cable to a magnet shaft rotatably carried in a cylindrical speedometer casing boss projecting from a speedometer frame, with said boss having a peripheral groove intermediate the leading end of said boss and the speedometer end of said boss together with a recessed periphery between said groove and the leading end of said boss to form a peripheral shoulder intermediate said leading end and said groove, the improvement comprising: a unitary plastic ferrule adapted to be fixed to said cable at one end and having an open end first tubular portion opposite said one end for receiving said leading end with the internal diameter of said tubular portion corresponding to said boss for coaxial engagement with said boss, an axially extending passageway in the annular wall of said tubular portion spaced intermediate the open end of said tubular portion and the opposite end of said tubular portion, a latch body integrally formed on said tubular portion intermediate the axially extending sides of said passageway and having a single juncture with said tubular portion at an axial position terminating said passageway adjacent said open end for flexure radially about the juncture of said latch body and said tubular portion, a hook on said latch body projecting radially inwardly from said latch body into said passageway for radial movement into said groove in response to axial alignment of said hook with said groove to prevent axial movement of said ferrule relative said boss with said tubular portion having peripheral surface contact with said boss on each axial side of said latch hook to avoid distortion of said ferrule wall and to insure coupling of the ferrule to said boss, a second reduced diameter tubular portion integrally formed between said first tubular portion and said ferrule one end for engaging said recessed periphery to provide an extended alignment surface for said ferrule, a radial wall formed between said first and second tubular portions to engage said peripheral shoulder for resisting thrust forces, and a lever integrally formed at the end of said latch body opposite said open end and extending towards said open end and spaced radially outwardly of said latch body whereby radially inwardly directed pressure on said lever flexes said latch body radially outwardly about the juncture of said latch body and first tubular portion to move said hook from said boss groove and enable detachment of said ferrule from said boss.